United States Patent [19]
Kozlovic et al.

[15] 3,644,790
[45] Feb. 22, 1972

[54] STATIC ANTIPUMP CIRCUIT BREAKER CLOSING SYSTEM

[72] Inventors: John M. Kozlovic, Greensburg; William H. South, McKeesport, both of Pa.

[73] Assignee: Westinghouse Electric Corporation, Pittsburgh, Pa.

[22] Filed: Mar. 25, 1970

[21] Appl. No.: 22,522

[52] U.S. Cl. .................................... 317/54, 317/148.5 B
[51] Int. Cl. .................................................. H02h 1/00
[58] Field of Search .......................... 317/54, 148.5 B

[56] References Cited

UNITED STATES PATENTS 3,183,416  5/1965  Circle .......................... 317/54 X
3,267,337  8/1966  Doyle et al. ................. 317/148.5 B Primary Examiner—L. T. Hix
Attorney—A. T. Stratton and Clement L. McHale

[57] ABSTRACT

The use of a charged capacitor in conjunction with the closing switch associated with a circuit breaker such that when the closing switch is closed, the capacitor discharges through the switch and the primary of a pulse transformer creating a pulse in the secondary of the transformer which, in turn, is used to gate a solid-state control device such as a triac or silicon controlled rectifier. The cathode and anode of the solid-state control device is in electrical series with the closing switch and the spring release coil of the circuit breaker, such that when the previously mentioned pulse is applied it causes the solid-state device to turn on and conduct current through the spring release coil thus actuating the closing of the circuit breaker. In the event the circuit breaker immediately reopens because of a fault in the protected circuit or a similar circumstance, the circuit breaker will not reclose again until the depressed closing switch is opened, thus allowing the aforementioned capacitor to recharge.

4 Claims, 4 Drawing Figures

STATIC ANTIPUMP CIRCUIT BREAKER CLOSING SYSTEM

BACKGROUND OF THE INVENTION

This invention relates to control circuits for circuit breakers and particularly to antipump devices used in conjunction with the control circuits of circuit breakers.

The phenomena of pumping is well known in the circuit breaker art. This phenomena occurs when an operator depresses a circuit breaker closing switch and the circuit breaker in attempting to close encounters a fault and being a protective device responds to the fault by reopening. But, if the closing switch has not been released, the closing sequence will begin again and the circuit breaker will again attempt to close. This cycle will continue indefinitely until the closing switch is released. Pumping is detrimental because it may cause parts of a circuit breaker to fail or allow surges of overload current to reach supposedly protected electrical equipment or endanger life. It should be noted that the closing operation of a circuit breaker could occur in a fraction of a second. This means that even if an operator is cognizant of the fact that a fault may exist and is prepared to quickly react to the situation he probably still could not release the closing switch fast enough to prevent some pumping.

Recognizing this dangerous possibility, inventors have devised means to prevent it. Usually, this is done with electromechanical relays. These relay circuits are well known in the art as the X- or Y-relay control schemes. In a typical embodiment, a Y-type relay system works like this. In electrical series with the operator's closing switch and the spring release coil, which, as the name implies, releases a spring causing the circuit breaker to close upon the application of power to the coil, is connected a relay having normally closed contacts which shall be called the Y-relay. The entire series of elements is connected to a control power source of suitable voltage and current capability. Also included in the series network associated with certain types of circuit breakers is a limit switch associated with a closing spring charging motor and a latch check switch which guarantees that various mechanical linkages used for closing the circuit breaker are in a proper orientation for a closing operation. When the control switch is manually actuated, current flows through its contacts from one terminal of the control power source to the other, through the normally closed contacts of the Y-relay which are connected in series circuit relation with the normally closed auxiliary contacts of the main circuit breaker, said series circuit being electrically connected in parallel with the operating coil of the Y-relay. Assuming that the aforementioned mechanical linkages are properly oriented, the latch check relay is closed and the current continues to flow through it. Also assuming that the electrical motor is at its spring charging limit, the motor limit switch relay is closed and current flows through its contact into the spring release coil, supplying power to the coil. Once the spring release coil is energized, it releases the spring which closes the circuit breaker through the action of the mechanical linkages or operating mechanism of the circuit breaker. As the circuit breaker closes, the circuit breaker auxiliary contacts, which are part of a series circuit which is connected in parallel with the Y-relay operating coil, open. When this happens, the current which was flowing through the Y-relay and the auxiliary contacts flows through the high-impedance Y-relay coil since there is no other path through which to flow. This energizes the Y-relay coil and causes the contacts of the Y-relay which are normally closed to open. When this happens, even if the circuit breaker contacts reopen, such as would happen if a fault were sensed, and the auxiliary contacts should reclose, the fact that the contacts of the Y-relay remain open prevents current from flowing in the spring release coil path and the circuit breaker will not reclose or pump. This is all contingent on the fact that the operator has not released the manually actuated circuit breaker closing switch. It should be noted that the impedance of the operating coil of the Y-relay is of such a relatively high magnitude as to prevent sufficient voltage to be impressed across the spring release coil to cause enough current to activate the spring release coil. Therefore the entire control circuit remains in a stable or inactive state until the control switch has been released in which case the power to the Y-relay coil is removed, deenergizing it and consequently reclosing the normally closed contacts of the Y-relay, preparing the circuit for another closing cycle.

This system though often used presents a number of problems, some of which are more significant than others. First, there is a general trend in the electrical and electronics industry to change electromechanical devices to solid state or at least electronic devices. One of the main reasons for this is speed of operation. It is generally conceded that electromechanical devices consisting of inductive coils and the mass of moving levers or arms react relatively slowly to prevent pumping. Solid state electronic components have no mechanical mass to move and have relatively low inductance so they can react more quickly. Another problem is environment. Even though pains are taken to seal relay contacts, dirt, dust and corrosive atmosphere eventually enter the surrounds of the relay contacts causing the relay to fail. Another problem exists because an electromechanical relay system usually requires more space than a solid state electronic system which can be made small due to the physical properties of semiconductor material. Still another problem exists because the opening and closing of contacts even in a low-voltage situation eventually causes wear and pitting of the relay contacts. A still further problem is relay bounce. This is a well-known phenomena in the relay art in which the flexible relay arm may bounce away from the contact it is supposed to engage, causing a circuit break that is undesirable. This bouncing is controlled by the mechanical damping and the flexibility of the relay arm. It is the result of vibration existing on the frame to which the relay is mounted and which vibration was caused by the closing of the relay in the first place. Of course this generally lessens the reliability of the system, especially when compared with an entire solid state circuit where the equivalent of making and breaking contacts is done without the use of moving parts.

Therefore, in keeping with the advancement of the art of electronics and to avoid many or all of the problems previously described, the use of solid state devices in the antipump networks of electronic control systems for circuit breakers has become prevalent. Typical examples can be found in U.S. Pat. Nos. 3,183,416; 3,214,642; 3,254,271 and 3,397,350. It has been found that although the control systems disclosed in the previously mentioned patents employ solid state or semiconductor elements to prevent pumping the different control systems have certain disadvantages.

SUMMARY OF THE INVENTION

In accordance with the invention, a capacitor of suitable rating is connected in series with a resistor between the terminals of the power source of the control circuit involved. Upon connection to the power source, the capacitor charged to the same voltage value as that of the power supply and does so in a time determined by the value of the capacitor and resistor in series. Connected at a node or junction point between the capacitor and the resistor of the charging network is a branch circuit leading to the primary of a pulse transformer. This branch circuit continues on one side of the associated circuit breaker closing switch. The other side of the circuit breaker closing switch is connected to the positive terminal of the power source. As long as the closing switch is not manually depressed, the node or side of the capacitor connected to the branch circuit acquires a negative voltage of value equal to the value of the power supply voltage. When the closing switch is depressed or closed, the impedance of the previously mentioned branch circuit is of such a low value compared with the impedance of the charging resistance that the capacitor discharges rapidly through the pulse transformer and closing switch to the positive terminal of the power source. It is to be noted that this occurs because the negative terminal of the capacitor is connected to the primary of the pulse transformer. The pulse generated by the discharging capacitor is reflected into the secondary of the pulse transformer. The secondary of the pulse transformer is connected in parallel with a shunt resistor and the gate-to-cathode circuit of a typical four element solid state or semiconductor control device, such as a triac or silicon controlled rectifier. Either device accomplishes the same purpose but a triac is more versatile because it reacts to both negative and positive going pulses on its gate while a silicon controlled rectifier reacts only to positive going pulses. The shunt resistor serves three purposes. First, it is reflected back into the primary of the pulse transformer and acts as a limit on the discharge of the capacitor through the closing switch. This is not necessarily desirable as it will increase discharge time. Second, the resistor is a near short circuit path for various extraneous noise pulses which are generated in the intrinsic shunt capacitance that exists between the anode and gate of most solid state control devices. If these extraneous noise pulses are not conducted away from the gate of the control device they will randomly trigger the control device causing unreliable circuit breaker closures. Third, the resistor acts as a shunt for some of the pulse current which is supplied for the gate of the solid state control device. From one standpoint, the shunt resistor should be low in value so as to provide an excellent path to ground or at least to the cathode of the solid state control device for the extraneous noise pulses which are generated in the previously mentioned intrinsic capacitance. But the resistor should also be high in value so as not to absorb too much of the current intended to trigger the gate of the control circuit. In balancing the above considerations, an intermediate value for the shunt resistor is used. Another way to avoid the deleterious effects of currents being generated in the intrinsic capacitance of the solid state control device is the use of a capacitor connected from the anode to the cathode of the solid state control device. This is virtually equivalent to connecting a capacitor from the anode to gate as only one diode separates the gate from the cathode. Therefore, when extraneous noise voltages are impressed on the anode-to-gate circuit of the solid state control device this capacitor will absorb much of the energy thus preventing it from generating currents in the intrinsic capacitor between the anode and gate of the device.

It is necessary that the current in the path from the anode to cathode, hereafter known as the "main circuit path," of the solid state control device, reach its rated conduction value before the gating pulse is removed. Otherwise, the triac or solid state control device will not completely turn on and will immediately revert to its off state.

The anode of the solid state control device is connected to the same terminal of the circuit breaker closing switch as the primary of the pulse transformer. The cathode of this solid state control device is connected to a series circuit which includes the auxiliary contacts of the main circuit breaker, the contacts of the latch check relay and the contacts of the motor limit relay. In addition, the latter series circuit includes the spring release coil of the circuit breaker and a resistor which are connected in parallel with one another. The reason for the parallel combination lies in the fact that the inductance of the spring release coil slows the rise of the currents in the anode to cathode path or the main circuit path of the solid state control device. As was previously mentioned, the current in this path must rise to a predetermined level, while the gating pulse is impressed upon the gate of the device. The resistor in parallel with the spring release coil allows current to immediately flow through it and bypass the highly inductive, current retarding spring release coil. Because of this arrangement, current builds up in the main circuit of the triac relatively faster than otherwise and the triac is completely turned on before the gate pulse is gone. At this point, the gate loses further control of the circuit and only an action in the main circuit can cause the solid state control device to turn off. The current in the spring release coil begins to build, and, when the spring release coil has received enough energy to activate the magnetic plunger, it does so thereby releasing the closing spring which, in turn, forces or actuates the linkages to close the main contacts of the circuit breaker. Concurrent with this is the opening of the auxiliary contacts which are is series with the main circuit of the triac or solid state control device. As the auxiliary contacts open, the main circuit is broken or interrupted and the solid state control device no longer conducts and control of the overall circuit is restored to the gate of that device. In other words, the main circuit of the silicon controlled rectifier loses control and the gate regains control. However, even if the operator has not removed his hand from the closing switch, the residual current discharging through the primary of the pulse transformer is by this time not of enough magnitude to retrigger the triac. Consequently, reclosing of the circuit breaker is impossible at this time. The closing switch must be reopened long enough to allow the capacitor to recharge before another closing is permitted. Usually the charging time of the capacitor is short relative to the operating time of the closing switch.

It can be seen that the functions of the antipump system used in the prior art are more effectively performed by a novel solid state circuit consisting of a triac or silicon controlled rectifier used in conjunction with a capacitor discharge network and a pulse transformer.

It is therefore an object of this invention to provide a more compact means to prevent pumping in a circuit breaker.

It is a further object to use solid state or semiconductor devices and pulse transformers in an antipumping means to prevent the deleterious effects caused by arcing and atmospheric environment upon the relay contacts of an electromechanical relay system.

It is a further object of this invention to provide a high speed antipump system which operates relatively faster than an electromechanical system.

It is a still further object of this invention to provide an antipump system which is free from the problem of the effect which is prevalent in relays mounted on vibrating frames.

It is a further object of this invention to achieve the above-stated results with the use of only one solid state device and a minimum of associated relay or other contacts.

DESCRIPTION OF THE PREFERRED EMBODIMENTS

Figure 1:
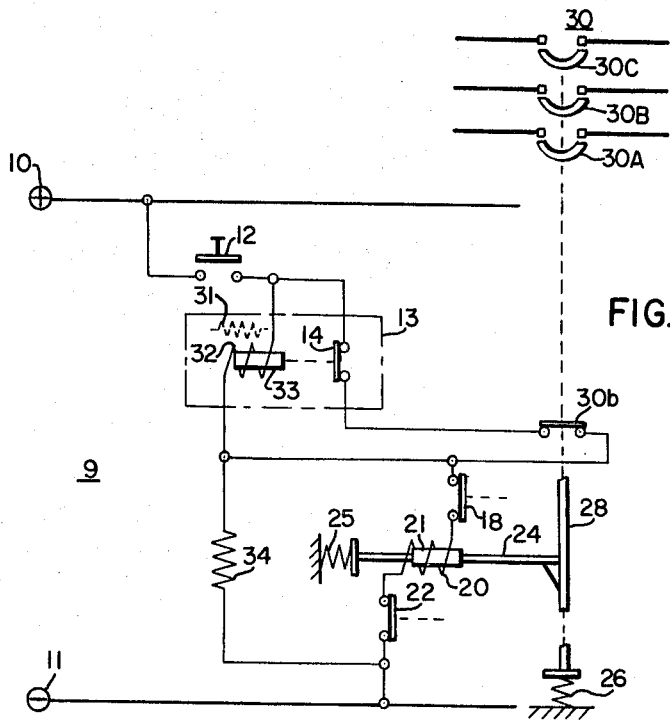
FIG. 1 is a view of prior art showing a typical circuit where relays are used as antipump devices in a circuit interrupter control system.

Referring now to the drawings, and more specifically to FIG. 1, one example of a prior art system for circuit breaker antipump control is shown, In general, the elements which make up the antipump circuit are connected between the terminals of a power source or main DC power supply 9 with the positive terminal marked 10 and the negative terminal marked 11, respectively. As the circuit breaker closing switch 12 is depressed or actuated, current flows from the positive terminal 10 through the contacts of switch 12 and into antipump device or relay 13. The current is forced to flow through normally closed contacts 14 of relay 13 rather than through coil 32 because the impedance of coil 32 is much higher than the impedance of the path in which closed contacts 14 of relay 13 is placed. Power continues to flow through normally closed auxiliary contact 30b of the main circuit breaker. Assuming that both the latch check switch contact 18 and motor limit switch contact 22 are in the closed position, current flows through them and through the spring release coil 20 energizing it and causing the plunger or armature 21 to move. As the plunger or movable magnetic core 21 of spring release coil 20 moves, latch rod 24 is forced to move correspondingly against the influence of the compression spring 25. When this happens, lift rod 28 is released and allowed to move in such a manner as to close the contacts of the circuit breaker 30. The closure of the contacts is caused by the force exerted on linkage 28 by the previously charged closing spring 26. As closure occurs, auxiliary contact b designated 30b opens. However, if there is a fault in the main circuit, other parts of the circuit breaker control system (not shown) will respond causing circuit breaker 30 to trip or reopen, thus reclosing auxiliary contact 30b. Under normal circumstances, were it not for the antipump mechanism or relay 13 of the circuit breaker control system, reclosure of switch 30b coupled with a continued depression of closing switch 12 would immediately cause a repetition of the previously described closing cycle. If this is allowed to continue, damage of some sort will result to the circuit breaker control system, to the circuit breaker itself, and to the protected equipment or its life. To prevent this, once the auxiliary switch or contact 30b has been opened, the path containing the auxiliary switch or contact 30b and the relay contact 14 has a very high impedance due to the open contact. Therefore, the normally high-impedance path which includes relay coil 32 and resistor 34 now represents a circuit of relatively lower impedance than the circuit in which auxiliary switch or contact 30b is connected. Consequently, an amount of current will flow into coil 32 of such a magnitude as to cause plunger 33 to move thus opening relay contact 14. After this happens, closure of auxiliary switch contact 30b will leave the circuit in which it is connected with the relay contact 14 inoperative to supply power to spring release coil 20. Furthermore, resistor 34 is of such a low-resistance value when compared with the resistance 31 in coil 32 that the voltage drop across resistor 34 is of a magnitude too low to energize coil 20 sufficiently to actuate the latch rod 24. Therefore, once circuit breaker closing switch 12 has been depressed and auxiliary switch or contact 30b has been once opened, the circuit containing spring release coil 20 can no longer be energized until circuit breaker closing switch 12 is released again. If circuit breaker closing switch 12 is released again, a subsequent depression of the switch 12 will actuate only one closing cycle of the circuit breaker each time.

Figure 2:
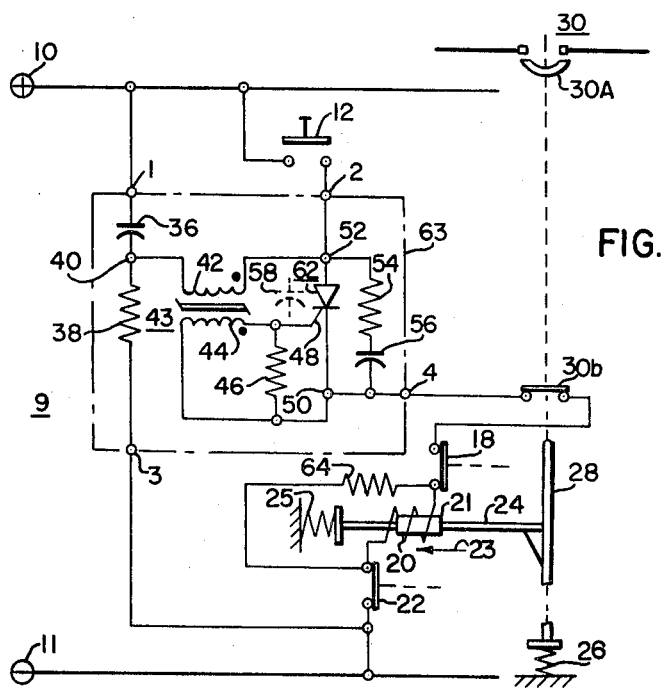
FIG. 2 is a view of a circuit similar to the one shown in FIG. 1 illustrating one embodiment of the invention in an antipump circuit.

Referring now to FIG. 2, it will be noted that the control circuit shown in FIG 2 is the same as the circuit depicted in FIG. 1 with the exception of the circuit indicated at 63. This may be called a circuit interrupter control means. The circuit indicated at 63 is employed rather than the circuit indicated at 13 in FIG. 1. The circuit indicated at 63 illustrates a preferred embodiment of the invention.

Assuming that circuit breaker or interrupter 30 is open and that auxiliary contact or switch 30b is closed and that both the latch check switch and motor limit switch designated by 18 and 22, respectively, are closed, the depression or actuation of switch 12 will cause a closing operation of circuit breaker 30. Under normal circumstances, capacitor 36 and complementary charging resistor 38 are in a static state such that capacitor 36 is charged to substantially the value of the power supply voltage or main source of power 9. The capacitor 36 was previously charged to this value through resistor 38 because that path which includes the resistor 38 provides a relatively lower impedance charging circuit compared with that of the generally parallel path shown connected to terminal 40. However, when circuit breaker closing switch or triggering means 12 is depressed, the predetermined impedance between terminal 40 and the positive power supply terminal 10 is relatively much lower than the impedance of the resistor 38. Therefore, current will flow from the negative terminal of capacitor or power storage means 36 at a junction point or node 40 through the primary 42 of a pulse transformer 43 and then through closing switch 12 to the positive terminal 10 of the power supply. A voltage pulse is thus created across the primary 42 of pulse transformer or gate activating means 43. This pulse is reflected or coupled into the secondary 44 of pulse transformer or pulse generating device 43. The induced voltage causes current flow in the secondary circuit. This current divides between the secondary winding shunting resistor 46 and the gate-to-cathode path 48, 50 of the solid state gating device or gate-controlled switch 62. Theoretically the value of resistor 46 is such that most of the current will flow into the gate 48 of the gated solid state switch or triac 62. Concurrently, once the circuit breaker closing switch 12 has been depressed, power is available at the anode 52 of the solid state control device or silicon controlled rectifier 62. Current will begin to flow through the solid state control device 62 as long as there is sufficient current or charge flowing into gate 48. When the main circuit current of the solid state control device becomes larger than the minimum turn-on current of the device 62, the device will become susceptible to control only from its main circuit, that is, from the elements in series with the main circuit of the silicon controlled rectifier 62. Subsequently, current in the secondary 44 of pulse transformer 43 will gradually cease to flow as capacitor 36 discharges all of its stored energy. When current begins to flow through the main circuit of the solid state control device 62, the overall circuit external to the circuit indicated at 63 starting at terminal 4 begins to react in a manner similar to that described with respect to FIG. 1. The current flows through the normally closed auxiliary contact 30b, through the latch check switch contact 18 and through the spring releasing magnetic coil protecting resistor 64 rather than through the inductance of the spring release coil or circuit interrupter closing means 20, and through motor limit switch 22. Current must flow through resistor 64 initially; otherwise, the high inductance of the spring releasing magnetic coil 20 will limit or retard the current buildup in the main circuit of the solid state control device 62 and the minimum turn-on current of the solid state control device 62 will not be achieved before the current flowing into gate 48 has decreased or died out. This will prevent a complete energization of the main circuit of solid state control device 62. However, because of this parallel path provided by resistor 64, current can immediately flow through the main circuit of the solid state control device 62 without being retarded by the inductance of coil 20. This in effect transfers control of the conduction state of the main circuit of the solid state control device 62 to those elements connected in series with the main circuit from the gate 48. Once the solid state control device 62 has been turned on, current will gradually begin to flow into the low-resistance, high-inductance coil and less current will flow in resistor 64 until a steady state condition is reached where most of the current is flowing in coil 20. This, of course, energizes spring releasing coil 20 causing plunger or magnetic core or armature 21 to move in direction 23 compressing spring 25, bringing attached linkage or tripping mechanism 24 with it and releasing spring biased linkage or lift rod 28 so that the main contacts 30A, 30B and 30C of the circuit breaker will close and the auxiliary contact or switch 30b will open through the force exerted by spring 26. When auxiliary contact 30b opens, the main circuit of the control device 62 is broken or controlled and the solid state control device 62 is once again susceptible to control only from the gate circuit 48. Upon sensing a fault and opening, the circuit breaker 30 may attempt to close again reopening auxiliary contact switch 30b. Normally this would cause pumping as previously described, but since only gate 48 can control solid state control switch 62, this will not happen as gate 48 must have a minimum amount of energy or current flowing into it. But this current will not flow as long as closing switch 12 has remained closed because the energy necessary to create a pulse in the secondary 44 of pulse transformer 43 has been dissipated and is not available to supply a sufficient current to gate 48. In order for a sufficient current to be present, capacitor 36 must be recharged but capacitor 36 will not recharge until closing switch 12 is released removing the low-impedance path which prevents the charging of the capacitor 36. When closing switch 12 is released, capacitor 36 will recharge from terminal 10 of the power supply through resistor 38 to the negative terminal 11 allowing for a repetition or new operation of the closing cycle should one be desired.

It should be noted that between anode terminal 52 and gate terminal 48 of the solid state control device or switch 62 is an internal, intrinsic capacitance designated 58. This capacitance has the potential to turn the solid state control device or switch 62 on when subjected to extraneous noise by converting voltage to current which may have a magnitude sufficient to temporarily actuate solid state control device 62 through gate 48. For this reason, resistor 46 is connected between gate terminal 48 and cathode terminal 50. This resistor 46 is designed to have a value of impedance or resistance much than the resistance between gate terminal 48 and cathode terminal 50. Therefore, any current generated by the capacitor 58 is shunted or diverted through resistor 46 rather than into gate 48. Otherwise, an extraneous current turn-on of the solid state control device could, under worst case conditions, energize coil 20 causing circuit breaker 30 to close. This would result in unreliable operation of the circuit 63.

Another way to avoid the effect of the existence of the intrinsic capacitor 58 is with a protecting capacitor 56 connected from the anode 52 to cathode 50 of solid state control device 62 through the resistor 54. Capacitor 56 is virtually or effectively in parallel with intrinsic capacitor 58, the only difference being that the low-voltage side of capacitor 56 is separated from the low voltage side of the intrinsic capacitor 58 by a single intrinsic diode in the solid state control device 62. Capacitor 56 is much larger than the intrinsic capacitor 58 and any extraneous noise voltage spikes generated between the anode 52 and gate 48 will be absorbed more by capacitor 56 than by capacitor 58. Therefore, any current generated in capacitor 58 which could be made available to gate 48 to turn on the solid state control device is minimized. Of course, capacitor 56 is charged at least to the value of the power supply voltage when the solid state control device 62 is not turned on. However, once the solid state control device 62 has begun to conduct or has been turned on due to a closing of the circuit breaker closing switch capacitor 56 discharges through a protecting resistor 54 into the anode 52 and out of the cathode 50 of the solid state control device 62. It is limited in its discharge by resistor 54 which must be of such a magnitude as to prevent destruction of or damage to the solid state control device 62 because of a surge of current through it from the discharge of capacitor 56. Capacitor 56 has another advantage, in that it assists in the turning on of solid state control device 62 upon the application of current to gate 48 by a turn-on pulse from the pulse transformer 43. It will be remembered that resistor 64 was placed in parallel with coil 20 to provide a low-impedance path for current flowing through solid state control device 62 so that the current in the main circuit of solid state control device 62 could build up to its minimum turn-on value before the power to gate 48 dissipated. The discharge of the current from capacitor 56 through resistor 54 into the solid state control device 62 adds or superimposes more current on the current already beginning to flow in the solid state control device 62 and insures that the device 62 will reach minimum turn-on current while the pulse on gate 48 is still present.

Figure 3:
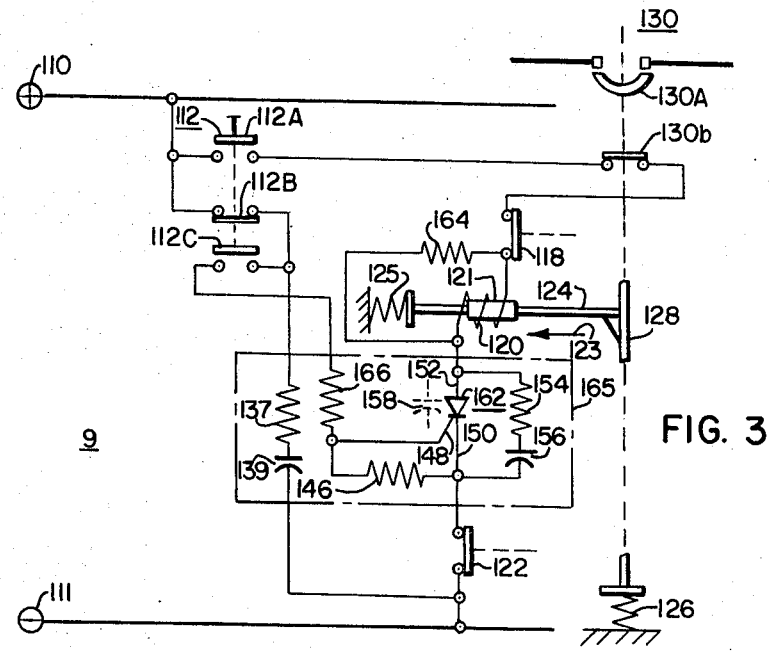
FIG. 3 is a view of a circuit showing another embodiment of the invention used as an antipump device.

Referring now to FIG. 3, another embodiment of the invention is shown in an antipump circuit breaker control circuit. In this case, circuit breaker closing switch 112 has three poles or contacts rather than one contact as shown in FIGS. 1 and 2. Upon closure of circuit interrupter closing switch or control switch 112, a series circuit is created between the positive terminal 110 and the negative terminal 111 of the control power supply 9. For current to flow in this circuit it is assumed that the circuit breaker 130 is open so that auxiliary contact or switch 130*b* will be closed. It also must be assumed that the latch check switch contact 118 is closed and motor limit switch contact 122 is closed. Closure of motor limit switch 122 is an indication that spring 126 is charged or loaded in such fashion as to close circuit breaker 130 when released. If all of the above assumptions are satisfied current flows from terminal 110 through circuit breaker closing switch pole or contact 112A (shown opened in FIG. 3) to auxiliary contact 130*b* through latch check switch contact 118 into the parallel combination of the spring release coil 120 and resistor 164 and then through the solid state control device 162 if it is turned on, and finally through motor limit switch contact 122. Energizing of spring release coil 120 causes magnetic plunger or armature 121 to move pulling latch rod or trip device 124 with it in direction 123 compressing spring 125 thus releasing lift rod or closing device 128 which closes the main contacts of circuit interrupter 130 indicated at 130A because of the force exerted by the biasing spring 126. As was mentioned, solid state control device 162 must conduct for this to happen. For solid state control device 162 to conduct, when circuit breaker closing switch 112 is closed, the normally closed contact 112B of said switch, which was previously used to allow capacitor 139 to charge to full power supply voltage through resistor 137 opens and the normally open contact 112C closes. Once the normally open contact 112C closes and normally closed contact 112B opens, the capacitor 139 discharges through the storage capacitor limiting resistor 137, closed contact 112C, gate resistor 166 into the gate 148 of the solid state control device 162, thus turning it on.

Closure of circuit breaker 130, one contact of which is represented by 130A, causes auxiliary contact 130*b* to open but if a fault is sensed in the protected circuit, circuit breaker 130 will reopen causing contact 130*b* to close. Unless contact 112B of switch 112 is reclosed, the capacitor 139 will not have sufficient charge remaining to turn solid state device 162 back on through gate 148. It must be remembered that solid state device 162 was turned off by the opening of contact 130*b*. Only upon releasing the circuit breaker closing switch 112 will contact 112B close, allowing capacitor 139 to recharge through resistor 137 and prepare for a subsequent discharge into gate 148 upon reclosure of switch 112. As can be seen in this situation, an antipump device is created without the use of a pulse transformer by using a multicontact switch as the circuit breaker closing switch 112, with two contacts normally open and one contact normally closed.

Figure 4:
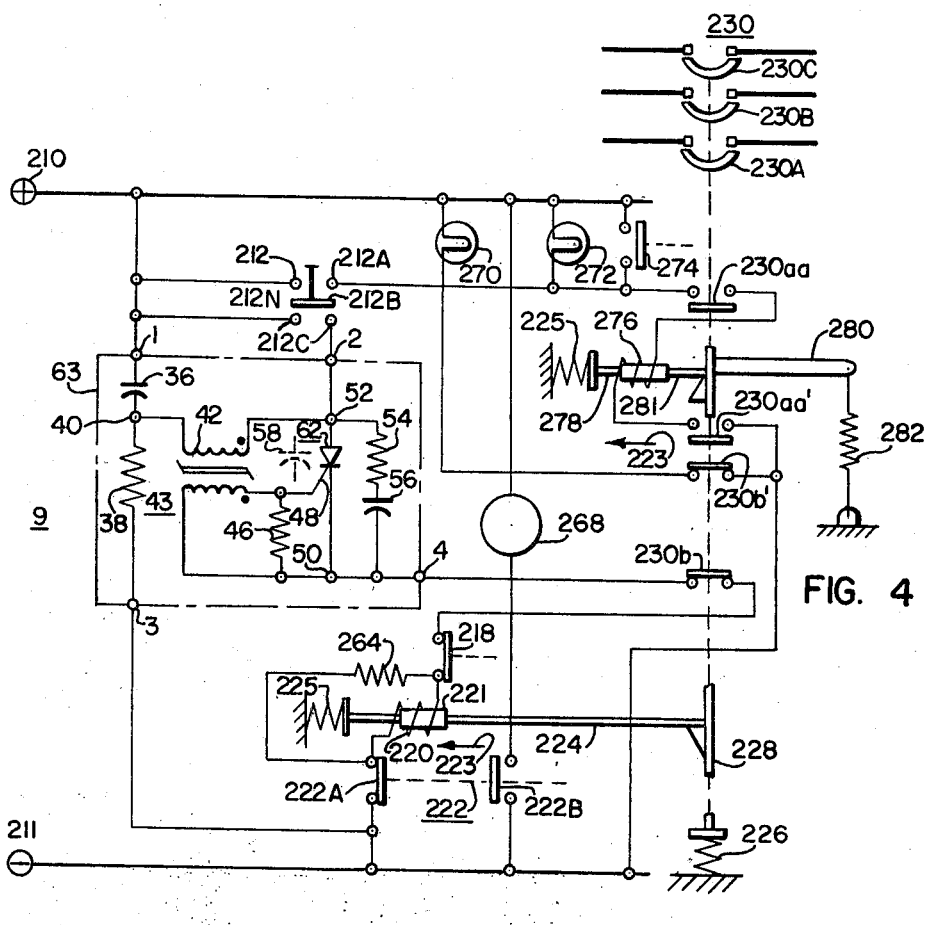
FIG. 4 is a circuit showing the antipump circuit shown in FIG. 2 incorporated in an overall circuit breaker control system.

Referring now to FIG. 4, a circuit is shown which is a practical example of an antipump circuit breaker control system embodying the invention and placed in a more complete electromechanical environment. It will be noted that at terminals 1, 2, 3, and 4 of the circuit 63 which embodies the teachings of the invention, the circuit 63 is the same as circuit 63 shown in FIG. 2. The circuitry indicated at 63 will perform the same functions as were performed by the circuit 63 shown in FIG. 2.

Once again, assuming that circuit breaker 230 is open, so that circuit breaker main contacts 230A, 230B and 230C are open, that auxiliary contacts 230*b* and 230*b'* are in their normally closed positions, that auxiliary contacts 230aa and 230aa' are in their normally open positions, that latch check switch contact 218 is closed, that motor limit switch 222 is in an operating position such that contact 222A is closed and contact 222B is open, that lift rod or linkage 228 is in a position to be actuated by the force exerted on it by charged biasing spring 226, that indicating light 270 which may be of any predetermined color, such as green is illuminated or lit because of the completed circuit through normally closed auxiliary contact 230*b'*, then the circuit breaker 230 is ready for closure. As combination circuit breaker closing and tripping or opening switch 212 is depressed or actuated into the closing operating position by engaging movable contact 212B with stationary contact 212C, capacitor 36 discharges from its negative side at terminal 40 through the pulse transformer 42 and the contacts 212B, 212C to the positive side of the power supply terminal 210 causing the same operation that was described previously in pulse transformer 43, shunt resistor 46, gate 48 and solid state control device 62 in connection with FIG. 2. This operation of course turns the solid state control device 62 on and the current in the main circuit or main path of the silicon controlled rectifier 62 builds up. When the current in coil 220 builds up, enough power is supplied to coil 220 to move the magnetic core of plunger 221 in direction 223 compressing spring 225 so as to cause linkage or tripping device 224 to release the mechanical linkage or closing device 228 which is powered by the charged biasing spring 226. The release of mechanical linkage or lift rod 228 closes the main contacts of circuit breaker 230. Concurrent with this operation, auxiliary contacts 230aa and 230aa' close and auxiliary contacts 230b' and 230b'' open. The opening of contact 230b opens the main circuit of the silicon controlled device 62 enabling it to be turned on or controlled only from gate 48 which by this time can no longer control or actuate the silicon controlled rectifier 62 because capacitor 36 has discharged and has not had an opportunity to recharge through resistor 38 which would be permitted by the opening or releasing of switch 212 and removing the short circuit from across capacitor 36. Therefore any pumping will be prevented if a fault is sensed in the protected circuit until switch 212 is released or reopened such that contact 212B disengages from points or contacts 212C. The opening of auxiliary contact 230b' opens the energizing circuit for indicating light 270 so that the light 270 is no longer lit or illuminated.

Assuming that no fault is detected in the main circuit, circuit breaker 230 will not pump or attempt to pump and since auxiliary contacts 230aa and 230aa' have closed, light 272 which is normally an indicating light of a different color, such as red will be energized.

When the circuit breaker is closed or begins to close, motor limit switch 222 changes position such that contact 222A is no longer closed but contact 222B is closed or engaged. As contact 222B engages, motor 268 is energized and operates in such a manner as to charge closing spring 226 which was discharged during the closing of the circuit breaker 230. Therefore, even though circuit breaker 230 may remain closed, spring 226 is charged again. When spring 226 has been fully charged by the action of motor 286, motor limit switch 222 will respond either electrically or through the movement of a cam and will change its position in such a manner that contact 222A will again be closed and contact 222B will reopen. The reopening of contact 222B will deenergize or remove power from motor 268 so it will not attempt to further charge an already charged spring 226 and the closing of contact 222A will permit the circuit in which spring release coil 220 is located to be energized. Under these conditions and provided latch check switch 218 is closed, circuit breaker tripping coil 276 is prepared to trip circuit breaker 230 if the need arises. It will be noted that upon closing of circuit breaker 230, the upward movement of linkage or lift rod 228 engages linkage 280 with linkage or trip rod 281 in such a manner that a subsequent movement of linkage 281 in direction 223 compressing spring 225 will cause linkage 228 to move downwardly due to a force on linkage 280 provided by tripping or opening spring 282.

Circuit breaker 230 may be tripped or opened upon the happening of either of two occurrences: (1) the detection of a fault in the protected circuit which will close or actuate switch 274 through suitable mechanical or electrical linkages thus energizing the circuit breaker opening or tripping coil 276 and causing a tripping of the circuit breaker by the movement of magnetic core or trip member 281, or (2) circuit breaker 230 can be opened manually by the movement of combination circuit breaker opening and tripping switch 212 from its normally neutral position indicated at 212N such that movable contact 212B engages points or contacts 212A. It will be noted that previously the circuit breaker 230 was closed by having contact 212B engage contacts 212C. This supplies power to circuit breaker tripping coil 276 causing a tripping action similar to that described in conjunction with the first occurrence. In either occurrence, indicating light 272 is shorted out and power is supplied as was mentioned to tripping coil 276 causing magnetic plunger or core 278 to move the tripping linkage or rod 281 thus releasing linkage 280 which through the action of tripping or opening spring 282 will open circuit breaker 230. Of course when circuit breaker 230 opens, auxiliary contacts 230aa and 230aa' open and auxiliary contacts 230b and 230b' close. The closing of contact 230b' energizes light 270 which may be green indicating that circuit breaker 230 is open, and of course the closure of contact 230b further enables the main closing circuit which includes the spring release coil 220 to operate so that a circuit breaker closing cycle as has been previously described with respect to all three of the previous figures can occur. Finally, the latch check switch 218 recloses when linkages 224 and 228 are in proper positions for a closing cycle or operation.

It is to be understood that the source of power for the various circuit breaker control systems as described with respect to the invention can be derived from any convenient DC source of power or from a rectified AC source of power as desired. It is also to be understood that the circuit 63 shown in FIGS. 2 aNd 4 operates in exactly the same fashion in both applications and that the resistors 46 and 54 and capacitor 56 in conjunction with the internal capacitor 58 of the silicon control device 62 perform the same functions, in FIG. 4 as they do in FIG. 2.

The apparatus embodying the teachings of this invention has several advantages. Among such advantages are increased speed of operation due to the elimination of relays with relatively heavy masses and the use of solid state devices, pulse transformers and switches. Another advantage is that the antipump control circuitry can be hermetically sealed to resist the effects of atmosphere upon the contacts. Also the fact that the antipump circuit is made up primarily of solid state or semiconductor components precludes any other problems associated with contaminating or other environments. Even though the use of a pulse transformer may be required in certain embodiments, the overall size of the antipump circuit can be reduced from the size required in the prior art circuit 13 of FIG. 1 to a size significantly smaller and associated with circuit 63 in FIG. 2 or circuit 165 in FIG. 3 or circuit 163 in FIG. 4. It is also an advantage of this invention that the wear and tear on components such as relay contact 14 as shown in circuit 13 of FIG. 1 is avoided since the mechanical pitting of contacts is not a factor in static contactless solid state control circuits. As should be readily evident, the circuit breaker closing switch or combination closing and tripping switch may be a standard control switch with a suitable number of contacts. Finally, solid state control circuitry avoids the problem of contact bounce that is prevalent in electromechanical relay systems upon the closing of a relay-type contact in the presence of severe vibration or shock.

Since numerous changes may be made in the above described apparatus and different embodiments of the invention may be made without departing from the spirit and scope thereof it is intended that all the matter contained in the foregoing description or shown in the accompanying drawings shall be interpreted as illustrative and not in a limiting sense.

We claim as our invention:

1. A control system for a circuit interrupter having a closing means comprising a source of control power, an energy storage means, a triggering means, said source of control power being connected in circuit relationship with said energy storage means and said triggering means, a gate-actuating means, said energy storage means and said triggering means being connected in circuit relationship with said gate-actuating means, a gate controlled switch, said triggering means also being connected in circuit relationship with said gate controlled switch, said gate controlled switch being connected in circuit relationship with said circuit interrupter closing means, said triggering means being actuable to provide power to said gate controlled switch and simultaneously to cause a release of energy from said energy storage means to said gate actuating means which, in turn, actuates said gate controlled switch to connect said source of power to the circuit interrupter closing means to thereby close said circuit interrupter, said energy storage means being capable of storing sufficient energy to actuate said gate actuating means only once for each actuation of said triggering means.

2. An antipump circuit breaker control circuit comprising a source of control power, a circuit interrupter comprising a pair of cooperating main contacts and a normally closed auxiliary contact, an energy storage means connected to said source of control power and having capacity to store the energy required to actuate only one closing operation of said circuit interrupter, a pulse generating device connected to said energy storage means to be actuated therefrom, a circuit interrupter closing switch connected in circuit relation with said energy storage means and said pulse generating device to control the actuation of said pulse generating device, a solid state gated device connected in circuit relation with said pulse generating device and said closing switch, and a spring releasing magnetic coil connected in series with said solid state gated device to said source, said circuit interrupter being actuated to close by the energizing of said spring releasing magnetic coil from said source, said circuit interrupter closing switch upon the closing of said switch providing power through said closing switch to said solid state gated device and generally simultaneously actuating said energy storage means to actuate said pulse generating device to produce a pulse which actuates said solid state gated device to energize said spring release magnetic coil from said source of power to actuate said main contacts of said circuit interrupter to close, said normally closed auxiliary contact being connected in electrical series with said spring release coil and said solid state gated device to open when said circuit interrupter closes thus deenergizing said spring release coil, said energy storage means after once actuating said solid state gated device having remaining thereon a quantity of energy insufficient to again actuate said gating device without said circuit interrupter closing switch being opened to permit charging of the said energy storage means from said source of power.

3. An antipump closing circuit for a circuit interrupter having separable main contacts, normally closed auxiliary contacts, and a closing spring releasing coil for actuating the closing of said main contacts, comprising a source of control voltage having negative and positive terminals, a closing switch connected to the positive terminal of said source, a pulse transformer having primary and secondary windings, an energy storage capacitor connected between the positive terminal of said source and one end of said primary winding, the other end of said primary winding being connected to said closing switch, a gated solid state switch having an anode, a cathode and a gate with the gate-cathode circuit being connected across said secondary winding, a shunting resistor connected in parallel with said gate-cathode circuit, a charging resistor connected between said capacitor and the negative terminal of said source to normally charge said capacitor to substantially the same voltage as said source, the anode-cathode circuit of said solid state switch being connected in series with said closing switch, said normally closed auxiliary contacts, and said spring releasing coil across said source with the anode of said solid state switch being connected relatively closer to the positive terminal of said source than said cathode, the energy from said capacitor being discharged through said primary winding when said closing switch is closed to produce a pulse of current in said secondary winding and said anode being substantially simultaneously connected to said source of control voltage, a portion of said pulse of current flowing through said gate-cathode circuit to actuate the gating of said solid state switch to thereby energize said spring releasing coil from said source through said normally closed auxiliary contacts and to actuate the closing of said main contacts, said spring releasing coil being deenergized by the opening of said auxiliary contacts when said main contacts close, said capacitor being prevented from recharging from said source following a closing operation so long as said closing switch remains closed to thereby prevent more than one closing operation of said circuit interrupter from being actuated by the closing of said closing switch even if said main contacts open after being once closed by the closing of said closing switch.

An antipump circuit breaker control circuit as described in claim 3, said source of control voltage comprising a rectified alternating current power supply.

* * * * *